United States Patent [19]

Gallucci et al.

[11] Patent Number: 4,885,335

[45] Date of Patent: Dec. 5, 1989

[54] LOW GLOSS THERMOPLASTIC BLENDS

[75] Inventors: Robert R. Gallucci, Mt. Vernon, Ind.; Ronald J. Wroczynski, Schenectady, N.Y.; James F. Jones, Windsor; Stefan F. Rasch, Cheshire, both of Mass.

[73] Assignee: General Electric Company, Mt. Vernon, Ind.

[21] Appl. No.: 289,937

[22] Filed: Dec. 27, 1988

[51] Int. Cl.$^4$ .............................................. C08L 69/00
[52] U.S. Cl. ........................................ 525/67; 525/74; 525/148
[58] Field of Search ................... 525/67, 133, 74, 148, 525/902, 903

[56] References Cited

U.S. PATENT DOCUMENTS

| | | | |
|---|---|---|---|
| 3,991,009 | 11/1976 | Margotte et al. | 260/42 |
| 4,148,842 | 4/1979 | Yu | 525/67 X |
| 4,226,950 | 10/1980 | Holub et al. | 525/67 |
| 4,460,742 | 7/1984 | Kishida et al. | 525/64 |
| 4,579,909 | 4/1986 | Giles et al. | 525/148 |
| 4,731,414 | 3/1988 | Ting | 525/71 |
| 4,742,104 | 5/1988 | Lindner et al. | 524/409 |

OTHER PUBLICATIONS

Ruppmich, K., "ASA-PC-An Interesting Alternative to ABS-PC", Kunststofe-German Plastics, 75(10)33-35(Oct. 1985) (in English).

*Primary Examiner*—Theodore E. Pertilla
*Attorney, Agent, or Firm*—Martin B. Barancik; Joseph T. Eisele

[57] ABSTRACT

A low gloss thermoplastic with good physical properties comprises a blend of a polycarbonate with an acrylonitrile-styrene-acrylate interpolymer and a gloss-reducing amount of a glycidyl (meth)acrylate copolymer.

12 Claims, No Drawings

LOW GLOSS THERMOPLASTIC BLENDS

BACKGROUND OF THE INVENTION

1. Field of the Invention

This invention relates to blends of aromatic carbonate polymers (resins) with acrylate-styrene-acrylonitrile interpolymers (ASA resins) further blended with certain acrylate copolymer resins for gloss reduction.

2. Brief Description of the Prior Art

Molded products made of thermoplastic polymers (resins) are frequently glossy. For some purposes, this is desirable. However, a matte or non-glossy surface is often preferable for products such as housings for computer terminals, typewriters, miscellaneous electrical appliances and certain automotive parts.

Elimination of gloss by surface embossing has been practiced but requires a separate step and adds cost. Moreover, subsequent abrasion may remove the embossed matte surface and cause the gloss to reappear.

The addition to the resin of a delustering agent such as finely-divided silica, silicate, alumina, or other mineral filler generally has a serious detrimental effect on the physical properties of the molded article, such as impact strength. Attempts to add a polymeric delustering agent also frequently have deleterious effects on physical properties, not only impact strength but also on heat distortion temperature, weathering, light stability, and other important properties.

U.S. Pat. No. 4,460,742 describes delustering additives with a core-shell rubber structure based on alkyl acrylate-styrene copolymers which are partially crosslinked.

Blends of polycarbonates with other thermoplastic resins are well known in the art. For example, blends of polycarbonates with certain ASA resins are disclosed in U.S. Pat. No. 4,148,842 and in Kunststoffe, Vol. 75, pp. 33-35 (1985). However, molding of such blends tend to have glossy surface characteristics. The same difficulties as discussed above are observed when conventional methods of reducing gloss are applied to these blends. It is desired to have a means for reducing the gloss in such blends while maintaining good physical properties such as impact strength, tensile strength, and heat resistance.

SUMMARY OF THE INVENTION

The composition of the invention comprises:

(a) at least one thermoplastic aromatic carbonate polymer;

(b) an acrylonitrile-styrene-acrylate (ASA) resin, the ratio of (a) to (b) being in the range of from about 10:90 to 90:10; and (c) an effective gloss-reducing amount of at least one polymer of glycidyl (meth)acrylate, preferably a copolymer of glycidyl (meth)acrylate with at least one comonomer from the group consisting of styrene, acrylonitrile, and alkyl (meth)acrylate (where the alkyl is other than glycidyl).

It has been found that such compositions provide substantial reduction in gloss while retaining desirable physical properties such as impact strength, tensile strength, and elongation.

The term (meth)acrylate as used herein is intended to designate both acrylate and methacrylate, i.e. it is equivalent to specifying an ester chosen from the group consisting of acrylate and methacrylate, and is employed for brevity.

DETAILED DESCRIPTION OF THE INVENTION

The aromatic carbonate polymers of component (a) encompass both polycarbonates and copolyestercarbonates.

The polycarbonate resins of component (a) and their method of preparation by interfacial polymerization are well known; see for example the details provided in the U.S. Pat. Nos. 3,028,365; 3,334,154; 3,275,601; 3,915,926; 3,030,331; 3,169,121; 3,027,814; and 4,188,314, all of which are incorporated herein by reference thereto.

In general, the method of interfacial polymerization comprises the reaction of a dihydric phenol with a carbonyl halide (the carbonate precursor).

Although the reaction conditions of the preparative processes may vary, several of the preferred processes typically involve dissolving or dispersing the diphenol reactants in aqueous caustic, adding the resulting mixture to a suitable water immiscible solvent medium and contacting the reactants with the carbonate precursor, such as phosgene, in the presence of a suitable catalyst and under controlled pH conditions. The most commonly used water immiscible solvents include methylene chloride, 1,2-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like. The preferred process for preparing polycarbonate resins of the invention comprises a phosgenation reaction. The temperature at which the phosgenation reaction proceeds may vary from below 0° C., to above 100° C. The phosgenation reaction preferably proceeds at temperatures of from room temperatures (25° C.) to 50° C. Since the reaction is exothermic, the rate of phosgene addition may be used to control the reaction temperature. The amount of phosgene required will generally depend upon the amount of the dihydric phenol and the amount of any dicarboxylic acid also present.

The dihydric phenols employed are known, and the reactive groups are the two phenolic hydroxyl groups. Some of the dihydric phenols are represented by the general formula:

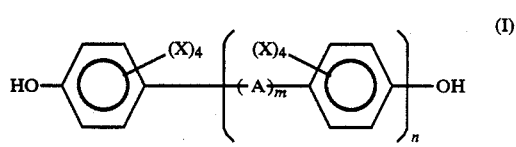

(I)

wherein A is a divalent hydrocarbon radical containing from 1 to about 15 carbon atoms; a substituted divalent hydrocarbon radical containing from 1 to about 15 carbon atoms and substituent groups such as halogen;

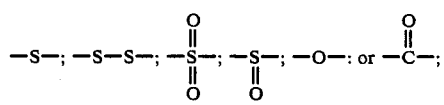

wherein each X is independently selected from the group consisting of hydrogen, halogen, and a monovalent hydrocarbon radical such as an alkyl group of from 1 to about 8 carbon atoms, an aryl group of from 6–18 carbon atoms, an aralkyl group of from 7 to about 14 carbon atoms, an alkaryl group of from 7 to about 14 carbon atoms, an alkoxy group of from 1 to about 8 carbon atoms, or an aryloxy group of from 6 to 18 carbon atoms; and wherein m is zero or 1 and n is an integer of from 0 to 5.

Typical of some of the dihydric phenols that can be employed are bis-phenols such as (4-hydroxyphenyl)methane, 2,2-bis(4-hydroxyphenyl)propane (also known as bisphenol-A), 2,2-bis(4-hydroxy-3,5-dibromophenyl)propane; dihydric phenol ethers such as bis(4-hydroxyphenyl) ether, bis(3,5-dichloro-4-hydroxyphenyl) ether; dihydroxydiphenyls such as p,p'-dihydroxydiphenyl, 3,3'-dichloro-4,4'-dihydroxydiphenyl; dihydroxyaryl sulfones such as bis(4-hydroxyphenyl) sulfone, bis (3,5-dimethyl-4-hydroxyphenyl) sulfone, dihydroxybenzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl) sulfide, bis(4-hydroxyphenyl) sulfoxide and bis(3,5-dibromo-4-hydroxyphenyl) sulfoxide. A variety of additional dihydric phenols are available and are disclosed in U.S. Pat. Nos. 2,999,835; 3,028,365 and 3,533,008; all of which are incorporated herein by reference. It is, of course, possible to employ two or more different dihydric phenols or a combination of a dihydric phenol with glycol.

The carbonate precursor can be either a carbonyl halide, a diarylcarbonate or a bishaloformate. The carbonyl halides include carbonyl bromide, carbonyl chloride, and mixtures thereof. The bishaloformates include the bishaloformates of dihydric phenols such as bischloroformates of 2,2-bis(4-hydroxyphenyl)propane, 2,2-bis(4-hydroxy-3,5-dichlorophenyl)propane, hydroquinone, and the like, or bishaloformates of glycols such as bishaloformates of ethylene glycol, and the like. While all of the above carbonate precursors are useful, carbonyl chloride, also known as phosgene, is preferred.

Also included within the scope of the present invention are the high molecular weight thermoplastic randomly branched polycarbonates. These randomly branched polycarbonates are prepared by coreacting a polyfunctional organic compound with the aforedescribed dihydric phenols and carbonate precursor. The polyfunctional organic compounds useful in making the branched polycarbonates are set forth in U.S. Pat. Nos. 3,635,895 and 4,001,184 which are incorporated herein by reference. These polyfunctional compounds are generally aromatic and contain at least three functional groups which are carboxyl, carboxylic anhydrides, phenols, haloformyls or mixtures thereof. Some nonlimiting examples of these polyfunctional aromatic compounds include 1,1,1-tri(4-hydroxyphenyl) ethane, trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are 1,1,1-tri(4-hydroxyphenyl)ethane, trimellitic anhydride or trimellitic acid or their haloformyl derivatives. Also included herein are blends of a linear polycarbonate and a branched polycarbonate.

As stated above, the term "aromatic carbonate polymers" as used herein is inclusive of copolyestercarbonates, i.e., resins which contain, in addition to recurring polycarbonate chain units of the formula:

(IIa)

wherein D is a divalent aromatic radical of the dihydric phenol employed in the polymerization reaction, repeating or recurring carboxylate units, for example of the formula:

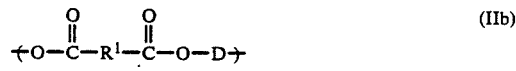

(IIb)

wherein D is as defined above and $R^1$ is as defined below.

The copolyester-polycarbonate resins are also prepared by interfacial polymerization technique, well known to those skilled in the art; see for example the U.S. Pat. Nos. 3,169,121 and 4,487,896.

In general the copolyester-polycarbonate resins are prepared as described above for the preparation of polycarbonate homopolymers, but by the added presence of a dicarboxylic acid (ester precursor) in the water immiscible solvent.

In general, any dicarboxylic acid conventionally used in the preparation of linear polyesters may be utilized in the preparation of the copolyester-carbonate resins of the instant invention. Generally, the dicarboxylic acids which may be utilized include the aliphatic dicarboxylic acids, the aromatic dicarboxylic acids, and the aliphatic-aromatic dicarboxylic acids. These acids are well known and are disclosed for example in U.S. Pat. No. 3,169,121 which is hereby incorporated herein by reference. Representative of such aromatic dicarboxylic acids are those represented by the general formula:

$$HOOC-R^1-COOH \qquad (III)$$

wherein $R^1$ represents an aromatic radical such as phenylene, naphthylene, biphenylene, substituted phenylene and the like; a divalent aliphatic-aromatic hydrocarbon radical such as an aralkyl or alkaryl radical; or two or more aromatic groups connected through non-aromatic linkages of the formula:

wherein E is a divalent alkylene or alkylidene group. E may also consist of two or more alkylene or alkylidene groups, connected by a non-alkylene or alkylidene group, connected by a non-alkylene or non-alkylidene group, such as an aromatic linkage, a tertiary amino linkage, an ether linkage, a carbonyl linkage, a silicon-containing linkage, or by a sulfur-containing linkage such as sulfide, sulfoxide, sulfone and the like. In addition, E may be a cycloaliphatic group of five to seven carbon atoms, inclusive, (e.g. cyclopentyl, cyclohexyl), or a cycloalkylidene of five to seven carbon atoms, inclusive, such as cyclohexylidene. E may also be a carbon-free sulfur-containing linkage, such as sulfide, sulfoxide or sulfone; an ether linkage; a carbonyl group; a direct bond; a tertiary nitrogen group; or a silicon-containing linkage such as silane or siloxy. Other groups which E may represent will occur to those skilled in the art. For purposes of the present invention, the aromatic dicarboxylic acids are preferred. Thus, in the preferred aromatic difunctional carboxylic acids, $R^1$ is an aromatic radical such as phenylene, biphenylene, naphthylene, or substituted phenylene. Some non-limiting examples of suitable aromatic dicarboxylic acids which may be used in preparing the poly(ester-carbonate) or polyarylate resins of the instant invention include phthalic acid, isophthalic acid, terephthalic acid, homophthalic acid, o-, m-, and p-phenylenediacetic acid, and the polynuclear aromatic acids such as diphenyl dicarboxylic acid, and isomeric naphthalene dicarboxylic acids. The aromatics may be substituted with Y groups. Y may be an inorganic atom such as chlorine, bromine, fluorine and the like; an organic group such as the nitro group; an organic group such as alkyl; or an oxy group such as alkoxy, it being only necessary that Y be inert to and unaffected by the reactants and the reaction conditions. Particularly useful aromatic dicarboxylic acids are those represented by the general formula:

(IV)

wherein j is a positive whole integer having a value of from 0 to 4 inclusive; and each $R^3$ is independently selected from the group consisting of alkyl radicals, preferably lower alkyl radicals (containing from 1 to about 6 carbon atoms).

Mixtures of these dicarboxylic acids may be employed. Therefore, where the term dicarboxylic acid is used herein it is to be understood that this term includes mixtures of two or more different dicarboxylic acids.

Most preferred as aromatic dicarboxylic acids are isophthalic acid, terephthalic acids, and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9.8.

Rather than utilizing the dicarboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example instead of using isophthalic acid, terephthalic acid or mixtures thereof, it is possible to employ isophthaloyl dichloride, terephthaloyl dichloride, and mixtures thereof.

The proportions of reactants employed to prepare the copolyester-carbonate resins of the invention will vary in accordance with the proposed use of the product resin. Those skilled in the art are aware of useful proportions, as described in the U.S. patents referred to above. In general, the amount of the ester bonds may be from about 5 to about 90 mole percent, relative to the carbonate bonds. For example, 5 moles of bisphenol A reacting completely with 4 moles of isophthaloyl dichloride and 1 mole of phosgene would give a copolyester-carbonate of 80 mole percent ester bonds.

The preferred polycarbonates for use in the present invention are those derived from bisphenol A and phosgene and having an intrinsic viscosity of about 0.3 to about 1.5 deciliters per gram in methylene chloride at 25°.

Component (b), the acrylonitrile-styrene-acrylate interpolymer (commonly known in the plastics art as ASA), is advantageously an impact-modified substantially-thermoplastic composition which comprises a styrene-acrylonitrile matrix, dispersed in which is an acrylate elastomer phase as an impact modifier. By interpolymer is meant a polymer composition having a plurality of phases, wherein the polymer phases are at least to some extent linked by grafting and/or by interpenetration of the chains of one phase into the other phase, with the interpenetrating chains possibly forming a network within the phase into which they penetrate. Such interpolymers are well known in the polymer art, and ASA is a well known exemplification thereof.

A preferred class of commercially available ASA resins comprises a crosslinked (meth)acrylate elastomer, a crosslinked styrene-acrylonitrile copolymer and a substantially linear styrene acrylonitrile copolymer. Methylated styrenes such as alpha-methylstyrene or vinyltoluene may be used in place of all or part of the styrene, and it is understood that when styrene is mentioned hereinafter, these methylated styrenes are encompassed. The ASA interpolymers can be prepared by a variety of known methods involving emulsion or bulk polymerization. Preferred resins of the ASA type are composed of core-shell impact modifiers in a styrene-acrylonitrile (SAN) matrix. The (meth)acrylate elastomer core portion of these resins may be composed of alkyl, aryl, or arylalkyl esters of acrylic or methacrylic acids. The core shell portion of the resin may be prepared by a two-step process in which the (meth)acrylate elastomer core (which is often slightly crosslinked with polyfunctional vinyl compounds) is covered with a thermoplastic shell of polymethyl methacrylate, polystyrene, styrene-acrylonitrile copolymer, or similar vinyl polymers or copolymers. The compositions may or may not have a comonomer to graft the core shell structure together. These ASA resins may be made for instance by the process of U.S. Pat. No. 3,944,631 (March 1976). The most preferred resins of this group comprise about 15 to about 90% of an uncrosslinked matrix of acrylonitrile/styrene polymerized and partly grafted on a core-shell impact modifier, typically about 5 to 50% of a crosslinked (meth)acrylate elastomer core with about 15 to about 35% of a crosslinked styrene acrylonitrile shell. All percentages are by weight relative to the total amount of the polymer (resin) (b). The crosslinking monomer may be typically a diacrylate of a diol. The shell and core are believed to be linked by having interpenetrating molecular networks, and the term interpolymer is applied to such products having such networks.

Other ASA resins which may be advantageously used in the composition of the invention are the types disclosed in U.S. Pat. Nos. 3,655,824, 3,830,878, 3,991,009, 4,433,102, 4,442,263, and 4,409,363 all of which are incorporated herein by reference thereto. These ASA resins have in common the use of the three monomers, namely acrylate ester, styrene (or alpha-methylstyrene), and acrylonitrile, to make a thermoplastic resin with good impact, heat distortion and weathering characteristics. They differ principally only in the method of manufacture and in detailed structure. As a class the ASA resins have good properties for blending with polycarbonates in view of their outer continuous phase of acrylonitrile-styrene copolymer.

The weight ratio resins of (a) to resins (b) may broadly be in the range of about 10:90 to 90:10. The preferred ratio, because of the best balance of properties, is in the range of about 10:90 to 75:25. All such ratios and percentages set forth herein are by weight. The presence of the minimum amount of the aromatic carbonate polymer affords a higher heat distortion temperature amongst other desirable properties. Amounts of polycarbonates above the ratios indicated are also useful but the specified minimum amount of ASA affords better processability.

In regard to component (c), the homopolymer or the copolymers of glycidyl (meth)acrylate and at least one comonomer selected from the group consisting of styrene, acrylonitrile, and alkyl (meth)acrylates (with alkyl other than glycidyl) are known products. A number of copolymers of glycidyl methacrylate are available commercially under the trade name Blemmer Resins, from Nippon Oil & Fats Co. Ltd. and Marubeni Corp. Ltd. (Japan). Variants of these resins where the styrene is substituted with alkyl or halogen are also usable.

Most broadly, these gloss reducing additives are polymers of the following structure:

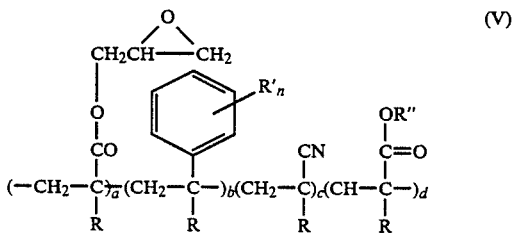
(V)

where

R = alkyl (preferably methyl) or hydrogen;

R' = alkyl, hydrogen, or halogen (especially Br) and n=0-5;

R'' = alkyl ($\leq$C18), aryl, alkylaryl, or hydrogen;

a = 1–100% (preferably 1–50%), b = 0–99% (preferably 1–99%);

c = 0–50%, d = 0–50%; and a+b+c+d = 100%

In regard to the polymer (c), the term "polymer" is intended to encompass both homopolymer and copolymers, It is preferred, however, that the polymer (c) be a copolymer with at least one of the comonomers enumerated above, and most preferably that one of the comonomers be styrene.

These copolymers (V) can be prepared by various and well known techniques for the polymerization of vinyl monomers such as by bulk and emulsion polymerization.

A gloss reducing effective amount of this component (c) is generally found to be in the range of about 0.05 to about 10%, preferably about 0.1% to about 5%, all by weight calculated relative to the weight of (a) and (b). Lesser amounts of (c) give insufficient gloss reduction, greater amounts are excessively costly and may adversely affect physical properties of the blend or moldings made therefrom.

The blends of the invention may be further modified by the addition of other types of conventional additives known to the art of plastics compounding. Such additives can include fillers (such as clay or talc), reinforcing agents (such as glass fibers), impact modifiers, other resins, plasticizers, flow promoters and other processing aids, stabilizers, colorants, mold release agents, flame retardants, ultraviolet screening agents, and the like.

The production of the compositions of the invention is done by any of the blending operations known for the blending of thermoplastics, such as blending in a kneading machine such as a Banbury mixer or an extruder, or solvent blending. The sequence of addition is not critical but all three main components should be thoroughly blended together.

The invention will be better understood with reference to the following examples, which are presented for purposes of illustration rather than for limitation, and which set forth the best mode contemplated for carrying out the invention.

EXAMPLES 1 to 7

Molding compositions were prepared by melt blending the compositions indicated in the table below in a twin screw extruder a temperature of at 220°-270° C. and 100-200 rpm. The blended and extruded material was then pelletized, dried and injection molded at about 240° C. to prepare test specimens. The gloss was measured by ASTM test method D-1003 at 60° using a Gardner gloss meter. Other physical properties were measured on injection molded samples using the following ASTM test methods: Tensile properties, D638; impact by notched Izod, D256; heat deflection temperature, under load (DTUL), D648-56 at a load of 18.6 Kg/cm2.

| Composition | Example No.: | | | | | | |
|---|---|---|---|---|---|---|---|
| (wt. %) | 1 | 2 | 3 | 4 | 5 | 6 | 7 |
| Polycarbonate[1] (PC) | 65 | 65 | 65 | 65 | 65 | 65 | 65 |
| ASA[2] | 35 | 35 | 35 | 35 | 35 | 35 | 35 |
| CP-10SA[3] | — | 0.5 | 1.5 | — | — | — | — |
| CP-20SA[3] | — | — | — | 0.5 | 1.5 | — | — |
| CP-15[3] | — | — | — | — | — | 1.5 | — |
| CP-20S[3] | — | — | — | — | — | — | 1.5 |
| Properties: | | | | | | | |
| gloss | 103 | 84 | 59 | 33 | 21 | 18 | 17 |
| Tensile yield (MPa) | 55.1 | 53.0 | 54.4 | 51.6 | 53.0 | 53.0 | 48.9 |
| Tensile break (MPa) | 45.4 | 57.1 | 47.5 | 46.8 | 47.5 | 40.6 | 50.3 |
| Elongation, % | 47 | 90 | 51 | 58 | 64 | 58 | 82 |
| Notched Izod J/m | 704.5 | 699.2 | 656.5 | 656.5 | 715.2 | 735.6 | 731.2 |
| DTUL °C. @ 1.82 MPa | 107.8 | n/a | 105.6 | 107.8 | 102.2 | 103.3 | 100.0 |

Notes to table:
1. Lexan ® polycarbonate 141-111 made by General Electric Co.; a polycarbonate made from bisphenol A and phosgene.
2. Geloy ® ASA resin 1120 made by General Electric Co.; an interpolymer of acrylonitrile-styrene, polymerized and partly grafted onto an acrylate-styrene elastomer (U. S. 3,944,631).
3. Blemmer GMA copolymer resins of Nippon Oil & Fats Co. (Japan) identified as follows:
CP-20S = 20% GMA/ 80% styrene
CP-20SA = 20% GMA/styrene/acrylonitrile, Mw 8,100.
CP-10SA = 10% GMA/styrene/acrylonitrile, Mw 8,700.
CP-15 = 15% GMA/methyl methacrylate/styrene/alkyl acrylate, Mw 11,400.

EXAMPLES 8 to 24

Further blends of GMA (Blemmer) copolymers were made by melt compounding at 230°-270° C. with blends of the same polycarbonate (PC) and ASA as in the preceding example but in various ratios, and tested as in the preceding examples.

| Example No. | PC/ASA Ratio | GMA Copolymer (note 1) | Gloss |
|---|---|---|---|
| — | 35/65 | none | 94 |
| 8 | " | CP-20SA (1.0) | 93 |
| 9 | " | CP-20SA (1.5) | 74 |
| 10 | " | CP-20MA (1.0) | 85 |
| 11 | " | CP-20S (1.0) | 17 |
| 12 | " | CP-20S (1.5) | 15 |
| 13 | " | CP-15 (1.0) | 26 |
| 14 | " | CP-50M (1.0) | 19 |
| — | 50/50 | none | 97 |
| 15 | " | CP-20S (1.0) | 13 |
| 16 | " | CP-20S (3.0) | 14 |
| 17 | " | CP-20S (5.0) | 21 |
| — | 65/35 | none | 98 |
| 18 | " | CP-20S (1.5) | 17 |
| 19 | " | CP-15 (1.5) | 15 |
| 20 | " | CP-10SA (0.5) | 84 |
| 21 | " | CP-10SA (1.5) | 52 |
| 22 | " | CP-20SA (0.5) | 33 |
| 23 | " | CP-20SA (1.5) | 38 |
| — | 70/30 | none | 95 |
| 24 | " | CP-20S (1.0) | 19 |

Notes to table:
1. GMA copolymer compositions, as in preceding examples, also:
CP-50M = 50% GMA/ 50% methyl methacrylate, Mw 10,000.
CP-20MA = 20% GMA/methyl methacrylate/ acrylonitrile, Mw 10,000.

These results show that all of these GMA copolymers had an effect in reducing gloss. The copolymers which do not contain acrylonitrile were relatively more effective in compositions with the higher ASA content.

What is claimed is:

1. A low-gloss thermoplastic blend comprising:
   (a) at least one thermoplastic aromatic carbonate polymer;
   (b) an acrylonitrile-styrene-acrylate (ASA) interpolymer, the ratio of (a) to (b) being in the range of from about 10:90 to 90:10 by weight; and
   (c) an effective gloss-reducing amount of from about 0.05 to 5% of at least one polymer of glycidyl methacrylate, in which, where said polymer of glycidyl methacrylate is a copolymer, at least one comonomer is selected from the group consisting of styrene, acrylonitrile, and esters, other than glycidol esters, of (meth)acrylic acids.

2. A low-gloss thermoplastic blend comprising:
   (a) at least one thermoplastic aromatic polycarbonate;
   (b) an acrylonitrile-styrene-acrylate interpolymer, the ratio of (a) to (b) being in the range of from about 10:90 to 75:25 by weight; and
   (c) from about 0.05% to 5% of at least one copolymer of glycidyl methacrylate with at least one monomer from the group consisting of styrene, acrylonitrile, and a (meth)acrylate ester other than the glycidol ester.

3. The thermoplastic blend defined in claim 2 herein said polycarbonate is derived principally from isphenol A.

4. The thermoplastic blend defined in claim 1 wherein said interpolymer (b) comprises a styrene-acrylonitrile matrix and a core-shell impact modifier of which the shell is styrene-acrylonitrile copolymer and the core is a crosslinked butyl (meth)acrylate rubber.

5. The thermoplastic blend defined in claim 4 wherein said polymer (b) comprises from about 15 to about 90% of an uncrosslinked matrix of acrylonitrile-styrene polymerized and partly grafted on a core-shell impact modifier, said impact modifier comprising from about 5 to about 50% of a crosslinked (meth)acrylate elastomer core with from about 15 to about 35% of a crosslinked styrene-acrylonitrile shell.

6. The thermoplastic blend defined in claim 2 wherein said glycidyl methacrylate copolymer is a copolymer with styrene.

7. The thermoplastic blend defined in claim 2 wherein said glycidyl methacrylate copolymer is a copolymer with styrene and an alkyl (meth)acrylate.

8. The thermoplastic blend defined in claim 1 wherein said polymer (a) is a polycarbonate derived principally from bisphenol A and phosgene, said polymer (b) is ASA and said polymer (c) is a copolymer of glycidyl methacrylate with styrene.

9. The thermoplastic blend defined in claim 1 wherein said component (a) is a polycarbonate derived principally from bisphenol A and phosgene, (b) is ASA and (c) is a copolymer of glycidyl methacrylate with methyl methacrylate.

10. A low-gloss thermoplastic blend comprising:
    (a) a polycarbonate derived principally from bisphenol A and phosgene;
    (b) an acrylonitrile-styrene-acrylate interpolymer resin having a styrene-acrylonitrile matrix and a core-shell impact modifier of which the shell is styrene-acrylonitrile copolymer and the core is a crosslinked butyl (meth)acrylate rubber; and
    (c) an effective gloss-reducing amount of a copolymer of glycidyl methacrylate with at least one comonomer selected from the group consisting of styrene, methyl methacrylate, and an alkyl acrylate; the ratio of (a) to (b) being in the range of about 10:90 to about 75:25 and the amount of (c) being in the range of about 0.05 to 5% calculated on the basis of the weight of (a) plus (b).

11. A low gloss thermoplastic blend as defined in claim 10 wherein said copolymer (c) is the copolymer of about 20% glycidyl methacrylate with styrene.

12. A low gloss thermoplastic blend as defined in claim 10 wherein said copolymer (c) is the copolymer of about 15% glycidyl methacrylate with methyl methacrylate, styrene, and an alkyl acrylate.

* * * * *

UNITED STATES PATENT AND TRADEMARK OFFICE
CERTIFICATE OF CORRECTION

PATENT NO. : 4,885,335

DATED : December 5, 1989

INVENTOR(S) : Robert Russell Gallucci, Ronald J. Wroczynski, James F. Jones, Stefan F. Rasch It is certified that error appears in the above-identified patent and that said Letters Patent is hereby corrected as shown below:

Col. 3, line 27
Delete "3,533,008" and add "3,153,008"

Col. 10, line 1
Delete "herein" and add "wherein"

Col. 10, line 2
Delete "isphenol" and add "bisphenol"

Signed and Sealed this

Thirtieth Day of October, 1990

Attest:

HARRY F. MANBECK, JR.

Attesting Officer

Commissioner of Patents and Trademarks